United States Patent [19]

Ando et al.

[11] Patent Number: 5,657,098

[45] Date of Patent: Aug. 12, 1997

[54] CONTROL CIRCUIT FOR USE WITH A CUT-OFF ADJUSTING CIRCUIT AND A DRIVE ADJUSTING CIRCUIT

[75] Inventors: Hiroshi Ando, Ibaraki; Hiroki Kinugawa, Kusatsu; Masahiko Sasada, Takatsuki, all of Japan

[73] Assignee: Matsushita Electric Industrial Co., Ltd., Osaka, Japan

[21] Appl. No.: 510,519

[22] Filed: Aug. 2, 1995

[30] Foreign Application Priority Data

Aug. 5, 1994 [JP] Japan ................... 6-184443

[51] Int. Cl.[6] ................... H04N 9/72; H04N 9/73; H04N 9/68
[52] U.S. Cl. ................... 348/645; 348/655; 348/689; 348/696
[58] Field of Search ................... 348/223, 180, 348/377, 380, 381, 655, 656, 694, 691, 692, 695, 696, 645, 647, 648, 756, 673, 689; H04N 9/72, 9/73, 9/68

[56] References Cited

U.S. PATENT DOCUMENTS

| | | | |
|---|---|---|---|
| 3,898,381 | 8/1975 | Amsen et al. | 348/380 |
| 4,458,263 | 7/1984 | Schutte | 348/647 |
| 4,751,577 | 6/1988 | Kawai | 348/695 |
| 5,257,096 | 10/1993 | Oshima | 348/380 |
| 5,325,184 | 6/1994 | Choi | 348/645 |
| 5,406,336 | 4/1995 | Harlos et al. | 348/673 |

FOREIGN PATENT DOCUMENTS 0 481 424  4/1992  European Pat. Off. .

OTHER PUBLICATIONS

Panasonic Company, "Service Manual for Color TV", 1992, Cover Sheet and p. 17.

Primary Examiner—Michael H. Lee
Assistant Examiner—Jeffrey S. Murrell
Attorney, Agent, or Firm—Ratner & Prestia

[57] ABSTRACT

Control circuits for the cut-off and drive control of video equipment. A first control device includes a cut-off control circuit and drive control circuit for use in conventional modes. A second control device includes a cut-off control circuit for mode switching and a drive control circuit for mode switching, independent of the first control device. The cut-off and drive adjustments made for every mode switching operation are unnecessary, and the mode switching based on off set data is possible.

7 Claims, 8 Drawing Sheets

CONTROL CIRCUIT FOR USE WITH A CUT-OFF ADJUSTING CIRCUIT AND A DRIVE ADJUSTING CIRCUIT

BACKGROUND OF THE INVENTION

This invention relates to an adjustment control circuit which controls adjustment of an input signal, and relates particularly to a color temperature switching circuit incorporated in a cut-off adjusting circuit and a drive adjusting circuit of an improved television receiver (TV) or display monitor.

In accordance with the development of large screen TVs, higher picture quality is necessary, and thus various kinds of adjusting circuits including the cut-off adjusting circuit and the drive adjusting circuit have been developed.

In adjusting the white-balance which is one of the most important fundamental TV characteristics, the cut-off adjusting circuit adjusts each of the DC levels of three primary color signals, and the drive adjusting circuit adjusts each of the amplitudes of said color signals. These are the most important fundamental circuits for establishing the accuracy of the white-balance.

FIG. 6 shows a block diagram of the conventional cut-off adjusting circuit and the drive adjusting circuit designed to receive a primary color signal.

In FIG. 6, terminal 41 is a primary color signal input terminal. Block 42 is a cut-off adjusting circuit which adjusts the DC level of the primary color signal at terminal 41. Block 43 is a cut-off control circuit by which a digital control signal is converted into an analog control signal for controlling the cut-off adjusting circuit 42. Block 45 is a drive adjusting circuit for adjusting the amplitude of the primary color signal that has a DC level that has been adjusted by cut-off adjusting circuit 42. Block 46 is a drive control circuit for converting a digital signal into an analog control signal for controlling the drive adjusting circuit 45. Block 44 is a micro-processor unit (MPU) for transmitting the digital control signals to the cut-off control circuit 43 and the drive control circuit 46. Terminal 47 is an output terminal for a primary color signal with a DC level adjusted by the cut-off adjusting circuit 42 and an amplitude adjusted by the drive adjusting circuit 45.

The operation of the cut-off adjusting circuit and drive adjusting circuit is explained below with reference to FIG. 7.

When a primary color signal at terminal 41 having a waveform as shown in FIG. 7(a) is input to cut-off adjusting circuit 42, the DC level of the primary color signal is adjusted to a level as shown in FIG. 7(b). The relative amplitude of the primary color signal exceeding a predetermined reference range determined by the amplitudes of the other primary color signals is adjusted by drive adjusting circuit 45 yielding a waveform as shown in FIG. 7(c).

This signal is then inverted and amplified by an inversion amplifier yielding an output of the primary color signal which is fed to the cathode of the Braun-tube of a TV (CRT) on which pictures are displayed. These signal adjustments have to be applied to each of the three primary color signals in order to accomplish the white-balance adjustment of a CRT.

The above-mentioned adjustments had been conducted within the inversion amplifier by using a set of manually adjusted variable resistors before the signal is outputted. The cut-off and drive adjustments of the primary color signal can now be performed before the primary color signal is fed to the inversion amplifier by applying control signals derived from a MPU as shown in the circuit in FIG. 6. The automatic white-balance adjustment circuit utilizing a MPU drastically reduces the man-power wasted in the white-balance adjustment.

In order to optimize the TV color reproduction of various video signal sources, switching of the color temperature according to the mode of the color temperature is performed by switching the cut-off and the drive voltage of the CRT. This can be performed easily by rewriting the MPU data.

However, in the above-mentioned control circuit, since the control of cut-off adjusting circuit and drive adjusting circuit and the control of the color-temperature mode switching are performed by using a common control circuit, the establishment of a linear relationship between the input digital control signal and the output analog control signal is essential to maintaining the resolution of the adjustment at a high level.

In actuality, however, the control range which maintains the linear relationship is limited. Moreover, while finer adjustments require a narrow controllable range, a wide control range has to be provided in order to adjust the color temperatures of video equipment including components having large variations such as a CRT. Thus, the controllable range can be made wider by adding a DC bias voltage to the analog voltage outputted from the adjust control circuit, and by adjusting the added DC bias voltage.

These operations can be illustrated by a stepped control characteristic curve obtained with a conventional cut-off control circuit or drive control circuit as shown in FIG. 8(a). The four steps in the control characteristic curves result from the application of four different added bias voltages including zero volts.

The control characteristic curves shown in FIGS. 8(a), 8(b) and 8(c) are produced by synthesizing a characteristic curve of the cut-off adjusting circuit 42 and a characteristic curve of the cut-off control circuit 43. The former curve is linear and the latter curve has overlapped steps.

The characteristic curves shown in FIGS. 8(a), 8(b) and 8(c) also illustrate the characteristics of the drive adjusting circuit. The characteristic curves are synthesized from a characteristic curve of the drive adjusting circuit 45 and a characteristic curve of the drive control circuit 46. The former curve is linear and the latter curve has overlapped steps.

However, in this case, it is very difficult to replace these four characteristic curves with a continuous single line containing no steps because of either the variations of the input/output conversion characteristics of the control circuits, or the variations of the bias voltages to be added.

If the bias voltage to be added is too high, the characteristics curve showing the control characteristics is shifted upward as shown in FIG. 8(c), producing regions in which necessary variations are unavailable. In order to avoid this situation, the bias voltages to be added have to be set at values less than the necessary values. Thus, a characteristic curve with overlapped steps as shown in FIG. 8(a) is produced.

Because of these steps, however, the variation would take a value of y' when the cut-off adjusting point is at point-a, while the variation would take a value of y when the cut-off adjust point is at point-b, even though the offset X step remains the same, thus producing a difference in the variations obtained in these two cases (see FIG. 8b).

Therefore, the value of off set has to be readjusted each time the mode switches (such as color temperature switching), so that mode switching is very difficult to perform because of the different off set values which have to be determined according to the cut-off adjusting data.

SUMMARY OF THE INVENTION

Considering the problems described above, the object of the present invention is to perform the adjustment of the control circuit more precisely and with higher efficiency by providing a control circuit (a second control) having a linear characteristic which makes the mode switching easier, along with the conventional control circuit (the first control) provided for general adjustments.

In order to solve the problem involved with the conventional systems, the control circuits for the cut-off adjustment and drive adjustment include a second control means comprising a cut-off control circuit for mode switching and a drive control circuit for mode switching, in addition to the first control means B consisting a cut-off control circuit and a drive control circuit for conventional modes.

By using the above-described circuitry, the cut-off adjustment and drive adjustment which have to be carried out at every mode switching operation become unnecessary since a control circuit dedicated to mode switching (the second control) is provided, so that mode switching can be carried out by using only the off set data. For example, the color temperature can be switched by using the color temperature switching control circuit (the second control) after performing the conventional white-balance adjustment. As a result, the white-balance adjustment and the color temperature switching can be carried out more precisely and easily.

BRIEF DESCRIPTION OF THE DRAWINGS

FIG. 1 is a block diagram of a control circuit for adjusting an input signal according to the present invention.

DETAILED DESCRIPTION OF THE INVENTION

A first embodiment of the present invention is now explained with reference to the attached drawings.

FIG. 1 shows a block diagram of the control circuits for adjusting an input signal. In FIG. 1, terminal 1 is an input terminal which receives an input signal. Block 2 is an adjusting circuit for adjusting the input signal. Block 3 is an adjust control circuit (the first control) having a control characteristic obtained by serially connecting m unit control characteristics from which an input/output characteristic is obtained. The adjust control circuit converts an n-bit digital control signal or a signal equivalent to m times of n bit signal, i.e., (n+log$_2$m) bits signal into an analog voltage and adds a bias voltage thereto. Variables n and m are integers and m is an even number.

Block 4 is a control circuit for mode switching (the second control means) having an n-bit or an unit control characteristics, by which said adjusting circuit is controlled beside the adjust control circuit 3. Terminal 5 is an output terminal which provides adjusted output signal. Block 6 is a control signal adding circuit adding the output of adjust control circuit 3 to the output of control circuit for mode switching 4. Block 7 is an MPU for supplying control signals to both the adjust control circuit 3 and the control circuit for mode switching 4.

Figure 5A:
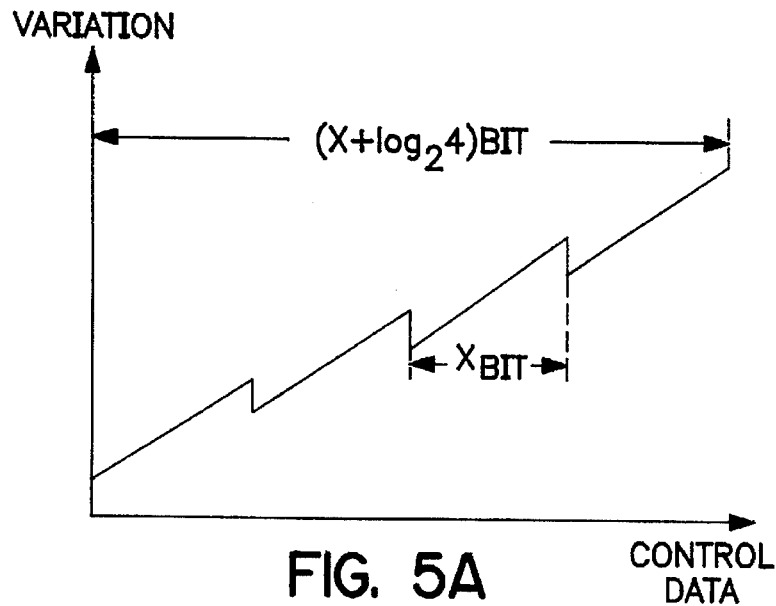
FIG. 5 (a) is a graph illustrating the characteristics of the control circuit shown in FIG. 1.
FIG. 5(b) is a graph illustrating the characteristics of the control circuit for mode switching, constituting a part of the control circuit shown in FIG. 1.
FIG. 5(c) is a graph explaining the operation of the control circuit shown in FIG. 1.
Figure 5B:
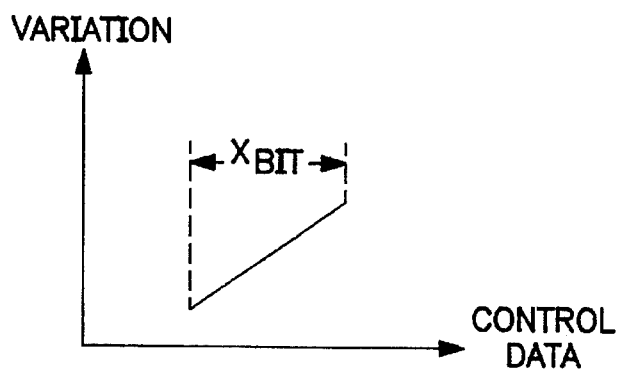

In the above control circuits, even if said adjust control circuit 3 has a discontinuous control characteristic such as the one shown in FIG. 5(a), a variation corresponding to the input of said control circuit for mode switching 4 can be obtained consistently independent of the adjusting point determined by said adjust control circuit 3, by adding the output of said control circuit for mode switching 4 to the output of said adjust control circuit 3 (first control).

Figure 5C:
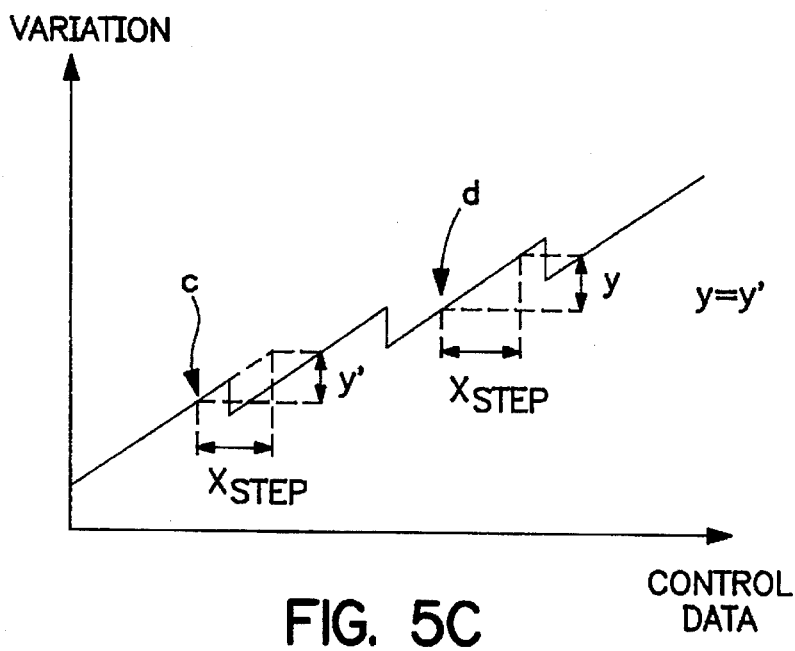
Figure 6:
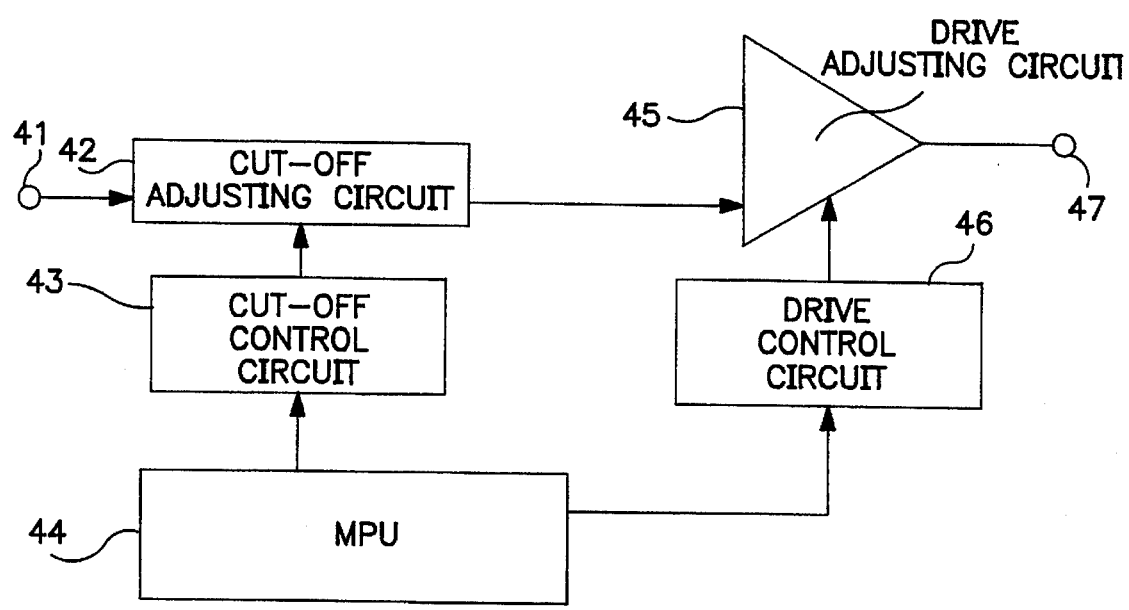
FIG. 6 is a block diagram of conventional cut-off adjusting circuit and drive adjusting circuit.
Figure 7A:
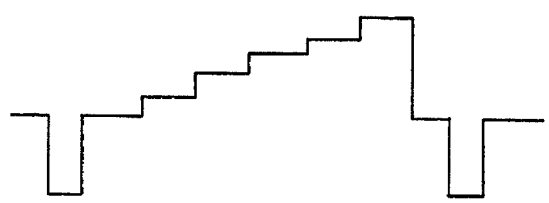
FIG. 7(a) is a waveform of a primary color signal input to the cut-off adjusting circuit and drive adjusting circuit of FIG. 6.
Figure 7B:
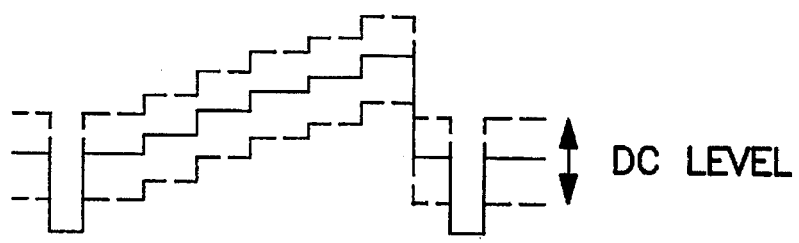
FIG. 7(b) is a waveform of a primary color B signal having a DC level which has been adjusted by the cut-off adjusting circuit and drive adjusting circuit of FIG. 6.
Figure 7C:
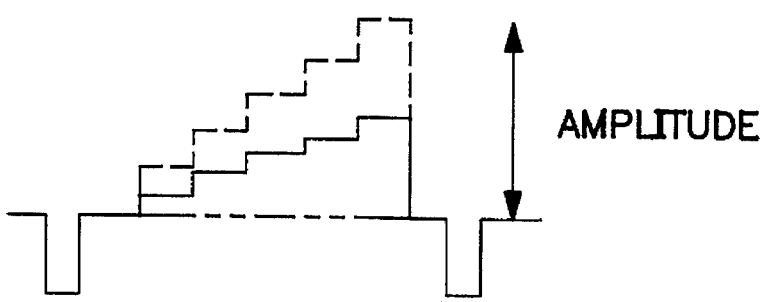
FIG. 7(c) is a waveform of a primary color signal having an amplitude which has been adjusted by the cut-off adjusting circuit and drive adjusting circuit of FIG. 6.
Figure 8A:
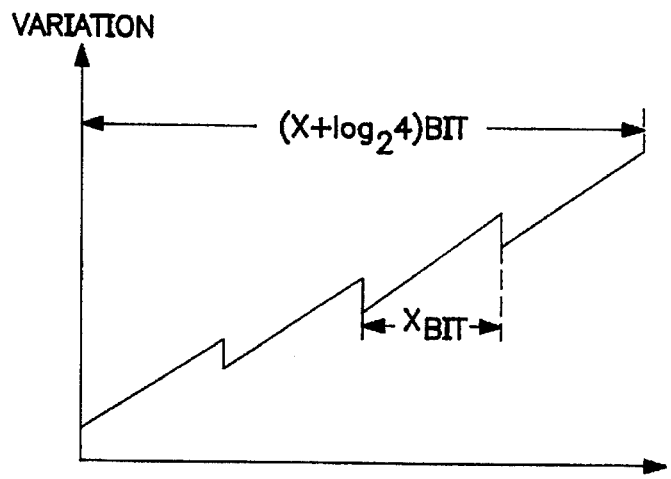
FIG. 8(a) is a graph illustrating the characteristics of the cut-off adjusting circuit and the drive adjusting circuit shown in FIG. 6.
Figure 8B:
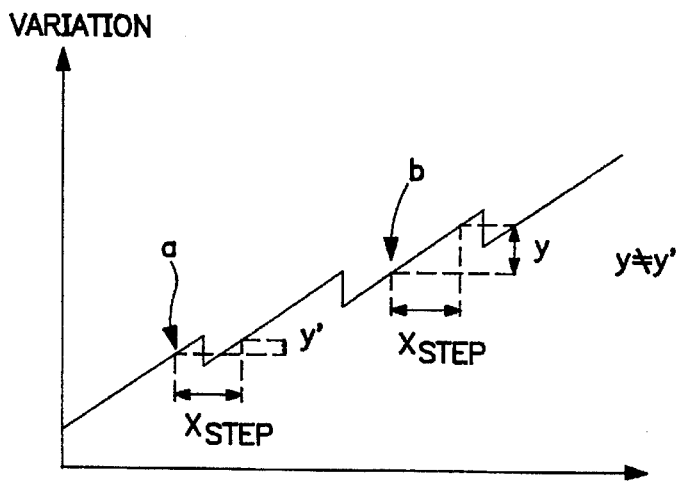
FIG. 8(b) is a graph explaining the off set operation performed by the cut-off adjusting circuit and drive adjusting circuit shown in FIG. 6.
Figure 8C:
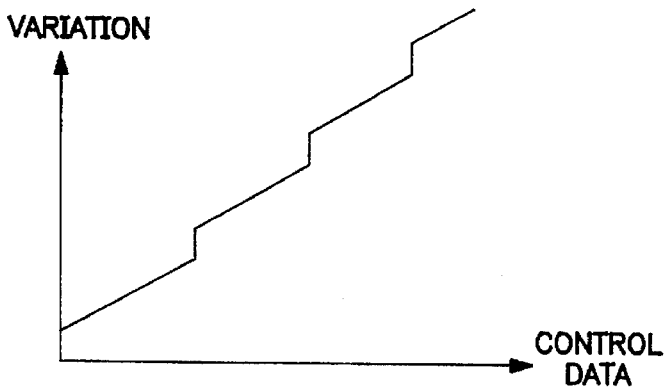
FIG. 8 (c) is a graph illustrating improper characteristics of the cut-off adjusting circuit and the drive adjusting circuit shown in FIG. 6.

As a result, the same variation can be obtained for the same control data consistently in either case of adjusting point c or d as shown in FIG. 5(c). Thus, the mode switching can be performed easily and precisely.

Figure 2:
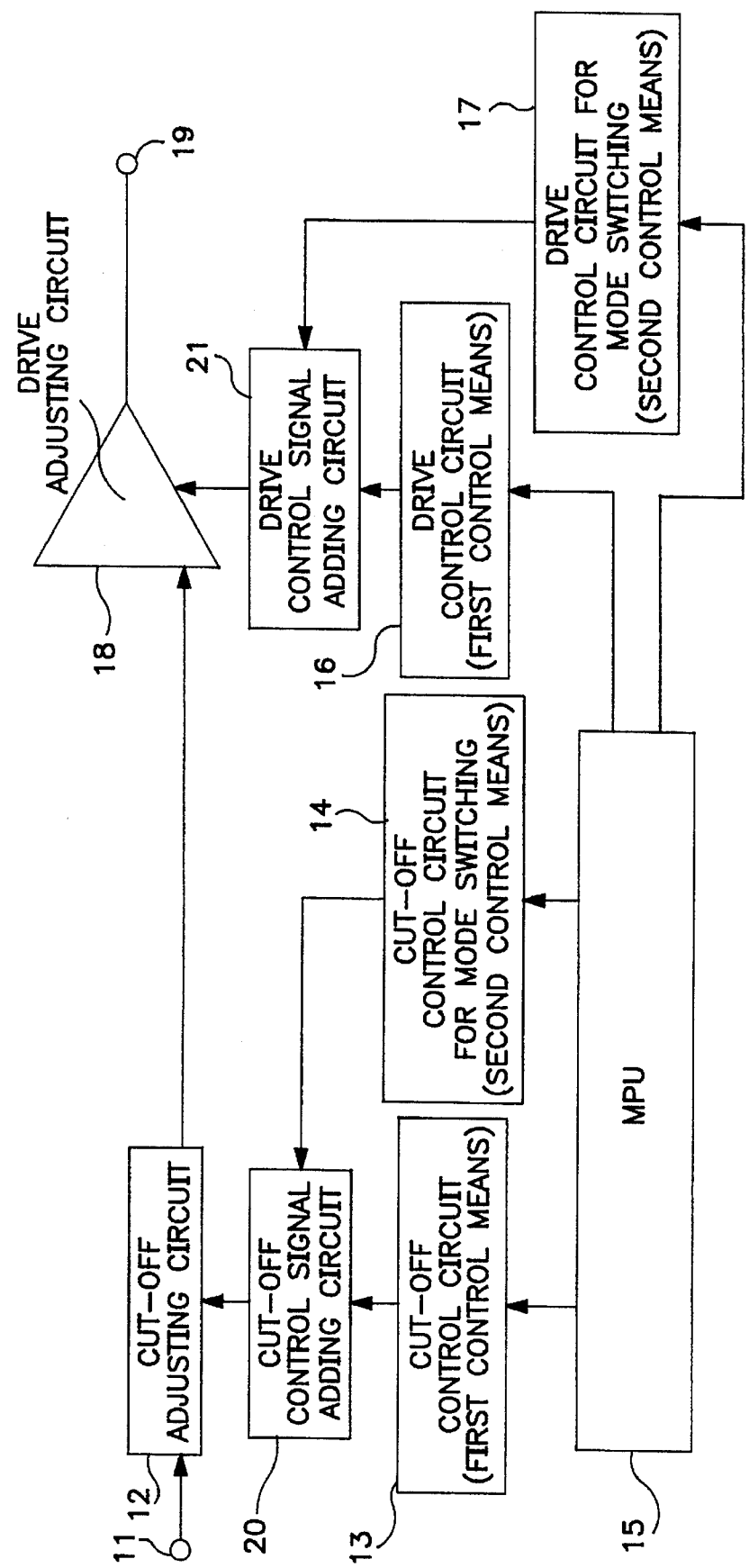
FIG. 2 is a block diagram of the cut-off adjusting circuit and the drive adjusting circuit according to the present invention.
Figure 2:
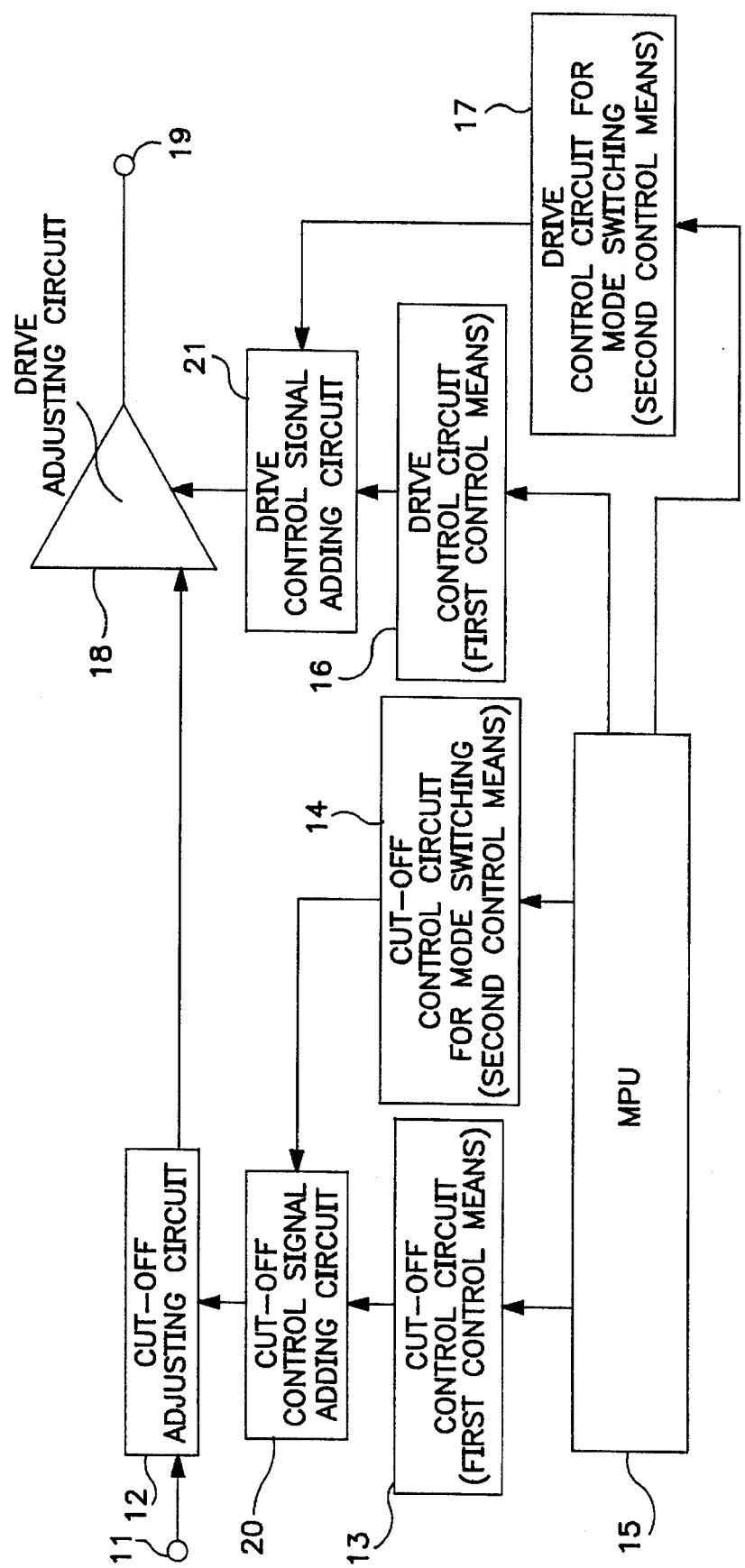

A block diagram of the second embodiment of the invention applied to the cut-off adjusting circuit of a CRT including the mode switching circuit is shown in FIG. 2.

In FIG. 2, terminal 11 receives an input primary color signal. Block 12 is a cut-off adjusting circuit for adjusting the DC level of the input primary color signal. Block 13 is a cut-off control circuit for controlling the cut-off adjusting circuit 12. Block 14 is a cut-off control circuit for mode switching for setting a different mode such as the switching of color temperature. Block 20 is a cut-off control signal adding circuit which adds the output of said cut-off control circuit 13 to the output of said cut-off control circuit for mode switching 14. Block 18 is a drive adjusting circuit for adjusting the amplitude of the primary color signal which has been DC level adjusted by said cut-off adjusting circuit 12. Block 16 is a drive control circuit for controlling the drive adjusting circuit 18. Block 17 is a drive control circuit for mode switching for setting a different mode such as the switching of color temperature. Block 21 is a drive control signal adding circuit which adds the output of said drive control circuit for mode switching 17 to the output of said drive control circuit 16. Block 15 is an MPU for supplying control signals to the cut-off control circuit 13, drive control signal 16, cut-off control circuit for mode switching 14, and the drive control circuit for mode switching 17. Terminal 19 is an output terminal which outputs the primary color signal which has been DC level adjusted by said cut-off adjusting circuit 12 and has been amplitude adjusted by the drive adjusting circuit 18.

In performing the cut-off and drive adjustments using the adjusting circuits shown in FIG. 2, the adjustment of color temperature in the conventional mode is performed by controlling both the cut-off adjusting circuit 12 and the drive adjusting circuit 18 by using the outputs of the cut-off control circuit 13 and drive control circuit 16 in order to adjust the color temperature of conventional mode.

The color temperature switching value for other modes is set by using both the cut-off control circuit for mode switching 14 and the drive control circuit for mode switching 17.

Once the color temperature switching value is set, since a wide control range is obtained despite the existence of a step in the cut-off control characteristics, the mode switching based on an arbitrary off set data value can be performed easily and precisely after the color temperature adjustment in the conventional mode is performed.

The operation is the same for the drive adjustment, thus a detailed explanation of the drive adjustment is omitted.

Figure 3:
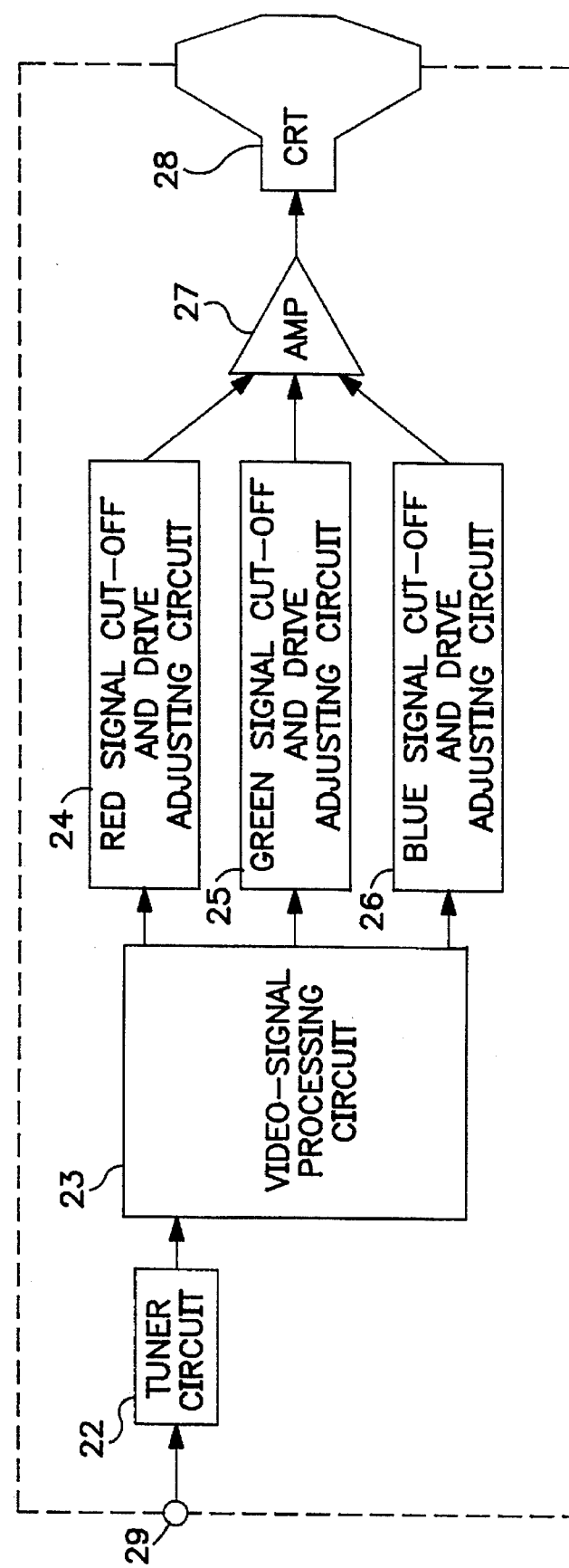
FIG. 3 is a block diagram of a TV provided with the cut-off adjusting circuit and the drive adjusting circuit shown in FIG. 2.

A block diagram of a third embodiment of the invention is shown in FIG. 3 which includes a TV equipped with the cut-off adjusting circuit and the drive adjusting circuit of the second embodiment of the invention.

In FIG. 3, terminal 29 receives a television signal received at an antenna. Block 22 is a tuner circuit of the TV which is coupled to input terminal 29. Block 23 is a video signal processing circuit which detects and amplifies the output of tuner circuit 22. Block 24 is a red color signal cut-off adjusting circuit and drive adjusting circuit according to the second embodiment shown in FIG. 2, which receives the red primary color signal outputted from video signal processing circuit 23. Block 25 is a green color signal cut-off adjusting circuit and drive adjusting circuit according to the second embodiment shown in FIG. 2, which receives the green primary color signal output from video signal processing circuit 23. Block 26 is a blue color signal cut-off adjusting circuit and drive adjusting circuit according to the second embodiment shown in FIG. 2, which receives the blue primary color signal output from video signal processing circuit 23. Block 27 is an amplifier for amplifying the primary color signals output by red, green, and blue cut-off adjusting circuit and drive adjusting circuits 24, 25, and 26 and for driving CRT 28. CRT 28 displays the television pictures.

In a TV of the above-explained construction, the mode switching after the cut-off adjustment can be performed more easily and more precisely.

Figure 4:
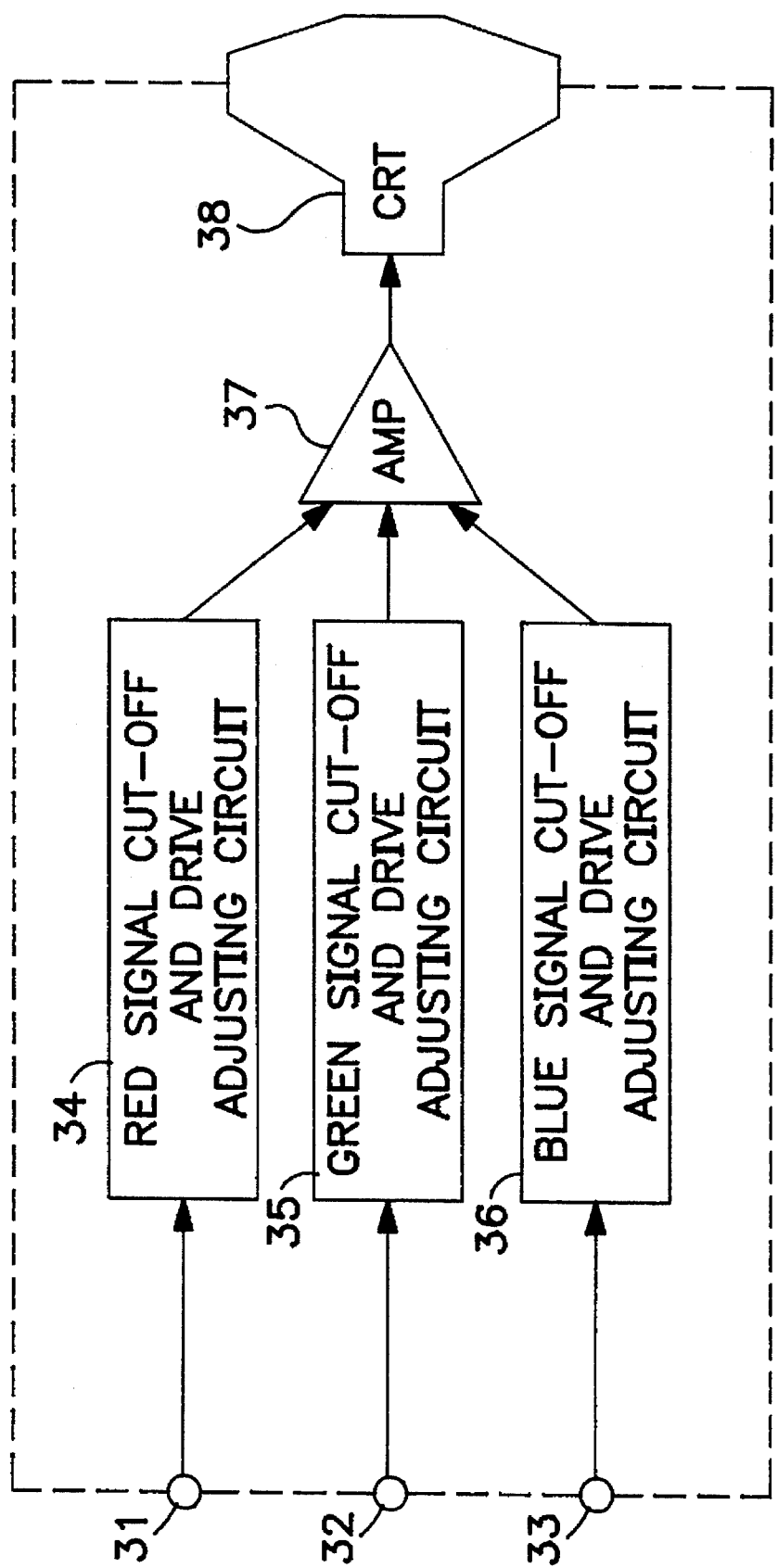
FIG. 4 is a block diagram of a video display device provided with the cut-off adjusting circuit and drive adjusting circuit shown in FIG. 2.

A block diagram of the fourth embodiment of the invention is shown in FIG. 4. This embodiment relates to TV video equipment for displaying pictures on a screen obtained by amplifying the input three primary color signals. The cut-off adjustment and drive adjustment processes explained in the second embodiment are applied to the input primary color signals.

FIG. 4 shows a block diagram of the circuits explained in FIG. 3. Input terminal 29, tuner circuit 22, and video signal processing circuit 23 (shown in FIG. 3) are excluded.

In FIG. 4, terminals 31, 32, and 33 are three input terminals which receive primary color signals of red, green, and blue respectively. Blocks 34, 35, and 36 are cut-off adjusting and drive adjusting circuits of the second embodiment, for performing the cut-off adjustment and drive adjustment of the three input primary color signals of red, green, and blue respectively.

Block 37 is an amplifier for amplifying the primary color signals output by the cut-off adjusting and drive adjusting circuits and for inputting these signals to CRT 38. These adjustments are performed by using the cut-off adjusting and drive adjusting circuit 34 for red signals, cut-off adjusting and drive adjusting circuit 35 for green signals, and cut-off adjusting and drive adjusting circuit 36 for blue signals.

In the video equipment shown in FIG. 4, similar to the video equipment of the second and third embodiments, easier mode switching and more precise mode switching can be obtained after the cut-off adjustments are performed.

By using the circuit configurations shown in FIG. 3 or FIG. 4, the control circuit for adjustment can be applied not only to the conventional TV but to video equipment such as a display monitor.

In the above-explained embodiments of the invention, only switching of the color temperature has been explained as an example for the mode switching by which the off set values of three primary color signals of red, green and blue are set at different values. However, the invention is also applicable where the off set values of said three primary color signals are independently and individually controlled, and where, in a user-control case, the instructions for the controls are made externally.

Furthermore, the invention is applicable to not only CRT cut-off adjustment and drive adjustment but also to the switching of audio frequency characteristics. This invention is applicable to all adjusting systems including a control circuit having a control characteristics composed of an arbitrary number of unit control characteristics.

As above-described, by applying the present invention, the operation of mode switching can be performed more easily and more precisely. Moreover, a relatively compact digital/analog converter circuit can be used as the control circuit by using a control circuit for mode switching as shown in FIG. 1 along with the conventional control circuit for adjustment, thus attaining a high degree of practicality.

What is claimed:

1. A control circuit comprising:
   an adjusting circuit for adjusting an input signal;
   a first control means for outputting a first control signal;
   a second control means for outputting a second control signal; and
   an adding means for adding said first control signal to said second control signal; wherein
   said adjusting circuit is controlled by the output of said adding means;
   an input/output conversion characteristic of said first control means is expressed by a characteristic line obtained by serially connecting m unit-characteristic lines, each unit characteristic line obtained by adding a bias voltage to the output of the first control means to which an n-bit signal is inputted; and an input/output conversion characteristic of said second control means is expressed by a straight line; and
   n and m are integers.

2. A control circuit according to claim 1 wherein said connected m unit-characteristic lines are disposed in parallel.

3. A control circuit according to claim 2 wherein said first control means is a digital/analog conversion circuit which inputs an $(n+\log_2 m)$ bit signal.

4. A cut off adjusting and drive adjusting apparatus for use with a CRT, comprising:

a cut-off adjusting circuit for adjusting the DC level of an input signal;

a drive adjusting circuit for adjusting the amplitude of the signal output by the cut-off adjusting circuit;

a first control circuit for controlling the cut-off adjusting circuit and another first control circuit for controlling the drive adjusting circuit in conventional modes; and a second control circuit for controlling the cut-off adjusting circuit and another second control circuit for controlling the drive adjusting circuit during color temperature switching modes.

5. A cut-off adjusting and drive adjusting apparatus of claim 4, further comprising:

a tuner circuit for receiving television signals;

a video-signal processing circuit for processing the signal output from said tuner circuit and providing an output signal to the cut-off adjusting circuit as the input signal;

an amplifier for amplifying the output of said drive adjusting circuit and for outputting a signal; and a CRT for displaying the output of said amplifier.

6. A cut-off adjusting and drive adjusting apparatus of claim 4, further comprising:

an amplifier for amplifying the input signal and for outputting an amplified signal; and a CRT for displaying the output of said amplifier.

7. A cut-off adjusting circuit and drive adjusting circuit for use with a CRT, comprising:

a cut-off adjusting circuit for adjusting the DC level of an input primary color signal;

a cut-off control circuit for controlling said cut-off adjusting circuit;

a cut-off control circuit for mode switching;

a drive adjusting circuit for adjusting the amplitude of the input primary color signal which has been DC level adjusted by said cut-off adjusting circuit;

a drive control circuit for controlling said drive adjusting circuit;

a drive control circuit for mode switching; and a microprocessor unit (MPU) for sending control signals to said cut-off control circuit, drive control circuit, cut-off control circuit for mode switching, and drive control circuit for mode switching.

* * * * *